USO05743304A

United States Patent [19]
Mitchell et al.

[11] Patent Number: 5,743,304
[45] Date of Patent: Apr. 28, 1998

[54] MULTI-LAYER FUEL AND VAPOR TUBE

[75] Inventors: Frank L. Mitchell, Rochester, Mich.; David L. Noone, Marsberg, Germany; Tao Nie, Macomb, Mich.

[73] Assignee: ITT Corporation, New York, N.Y.

[21] Appl. No.: 329,900

[22] Filed: Oct. 27, 1994

Related U.S. Application Data

[63] Continuation-in-part of Ser. No. 896,824, Jun. 11, 1992, Pat. No. 5,383,087, which is a continuation-in-part of Ser. No. 868,754, Apr. 14, 1992.

[51] Int. Cl.⁶ ..................................................... F16L 11/04
[52] U.S. Cl. ............................ 138/137; 138/141; 138/146
[58] Field of Search ............................ 138/137, 125, 138/126, 127, 141, 146

[56] References Cited

U.S. PATENT DOCUMENTS

| 3,070,132 | 12/1962 | Sheridan . |
| 3,473,087 | 10/1969 | Slade . |
| 3,561,493 | 2/1971 | Maillard et al. . |
| 3,828,112 | 8/1974 | Johansen et al. . |
| 3,907,955 | 9/1975 | Viennot . |
| 4,059,847 | 11/1977 | Phillips et al. . |
| 4,272,585 | 6/1981 | Strassel . |
| 4,330,017 | 5/1982 | Satoh et al. . |
| 4,675,780 | 6/1987 | Barnes et al. . |
| 4,685,090 | 8/1987 | Krevor . |
| 4,880,036 | 11/1989 | Kitami et al. . |
| 4,887,647 | 12/1989 | Igarashi et al. . |
| 4,984,604 | 1/1991 | Nishimura . |
| 5,019,309 | 5/1991 | Brunnhofer . |
| 5,038,833 | 8/1991 | Brunnhofer . |
| 5,076,329 | 12/1991 | Brunnhofer . |
| 5,142,782 | 9/1992 | Martucci . |
| 5,143,122 | 9/1992 | Adkins . |

FOREIGN PATENT DOCUMENTS

| 0551094 | 1/1993 | European Pat. Off. . |
| 2577168 | 8/1986 | France . |
| 2577564 | 8/1986 | France . |
| 3821723 | 9/1989 | Germany . |
| 4001126 | 12/1990 | Germany . |
| 9007303 | 2/1991 | Germany . |
| 3942353 | 6/1991 | Germany . |
| 4006870 | 7/1991 | Germany . |
| 496198 | 9/1970 | Switzerland . |
| 2204376 | 11/1988 | United Kingdom . |
| WO9321466 | 10/1993 | WIPO . |

Primary Examiner—David Scherbel
Assistant Examiner—James F. Hook
Attorney, Agent, or Firm—Thomas N. Twomey; J. Gordon Lewis

[57] ABSTRACT

A layered tubing for use in a motor vehicle composed of a thick outer layer having an inner and an outer face, the outer layer made of an extrudable thermoplastic elastomer; a thin intermediate bonding layer bonded to the inner face of the thick outer layer, the bonding layer composed of an extrudable melt-processible thermoplastic capable of sufficiently permanent laminar adhesion with the thick outer layer; an interior layer bonded to the intermediate bonding layer, the interior layer composed of a fluoroplastic which is resistant to permeation by and interaction with short-chain aliphatic and aromatic compounds; and an innermost electrostatic dissipation layer.

28 Claims, 2 Drawing Sheets

MULTI-LAYER FUEL AND VAPOR TUBE

I. RELATED APPLICATION

This application is a continuation-in-part of Ser. No. 07/896,824 which was filed on Jun. 11, 1992 and is now U.S. Pat. No. 5,383,087 and, itself, is a continuation-in-part of Ser. No. 07/868,754, filed Apr. 14, 1992 currently pending before the United States Patent and Trademark Office.

II. FIELD OF THE INVENTION

The present invention relates to a hose for use in a motor vehicle. More particularly, the present invention relates to a multi-layer hose which can be employed as a fuel line or vapor recovery line in a motor vehicle.

III. BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6,6, Nylon 11, and Nylon 12.

Alcohol and aromatics in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6,6 either separately or in combination with blends of polyamide elastomers. The internal layer is also composed of polyamides; preferably modified or unmodified Nylon 6, while the outer layer is composed of either Nylon 6 or Nylon 12.

Another tubing designed to be resistant to alcoholic media is disclosed in UK Application Number 2 204 376 A in which a tube is produced which has a thick outer layer composed of polyamides such as Nylon 6 or 6,6 and/or Nylon 11 or 12 which are co-extruded with an alcohol-resistant polyolefin, a co-polymer of propylene and maleic acid.

Heretofore it has been extremely difficult to obtain satisfactory lamination characteristics between dissimilar polymer layers. Thus all of the multi-layer tubing proposed previously have employed polyamide-based materials in most or all of the multiple layers. While many more effective solvent-resistant chemicals exist; their use in this area is limited due to limited elongation properties, strength and compatibility with Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area gradually eroding the area and leading to eventual rupture. This in turn, leads to the danger of fire and explosion of the flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which would be capable of preventing the build-up of electrostatic charge therein or would be capable of safely dissipating any electrostatic charge induced therein.

SUMMARY OF THE INVENTION

The present invention is a multi-layer tube which can be used on motor vehicles for applications such as in a fuel line system or a vapor recovery or return line system. The tube of the present invention is composed of:

a thick outer layer having a given thickness and an inner and an outer face, the outer tubing consisting essentially of an extrudable thermoplastic material;

a thin intermediate bonding layer bonded to the inner face of the thick outer layer, the bonding layer consisting essentially of an extrudable melt-processible thermoplastic material capable of sufficiently permanent laminar adhesion to the outer layer;

an interior layer bonded to the intermediate bonding layer, the interior layer consisting essentially of an extrudable, melt-processible thermoplastic material capable of sufficiently permanent laminar adhesion with the intermediate bonding layer, the thermoplastic material containing as a major constituent, a thermoplastic which is chemically dissimilar to the thermoplastic employed in the thick outer layer, the chemically dissimilar thermoplastic being resistant to permeation and interaction with short chain aliphatic and aromatic compounds; and an innermost electrostatic dissipation layer integrally bonded to the multi-layer tubing, the electrostatic discharge layer consisting essentially of an extrudable, melt-processible thermoplastic material having an electrostatic dissipation capacity in a range between about ohm/cm$^2$.

DESCRIPTION OF THE DRAWING

The objects, features and advantages of the present invention will become more readily apparent from the following description, reference being made to the following drawing Figures in which.

DESCRIPTION OF THE PREFERRED EMBODIMENT

Figure 1:
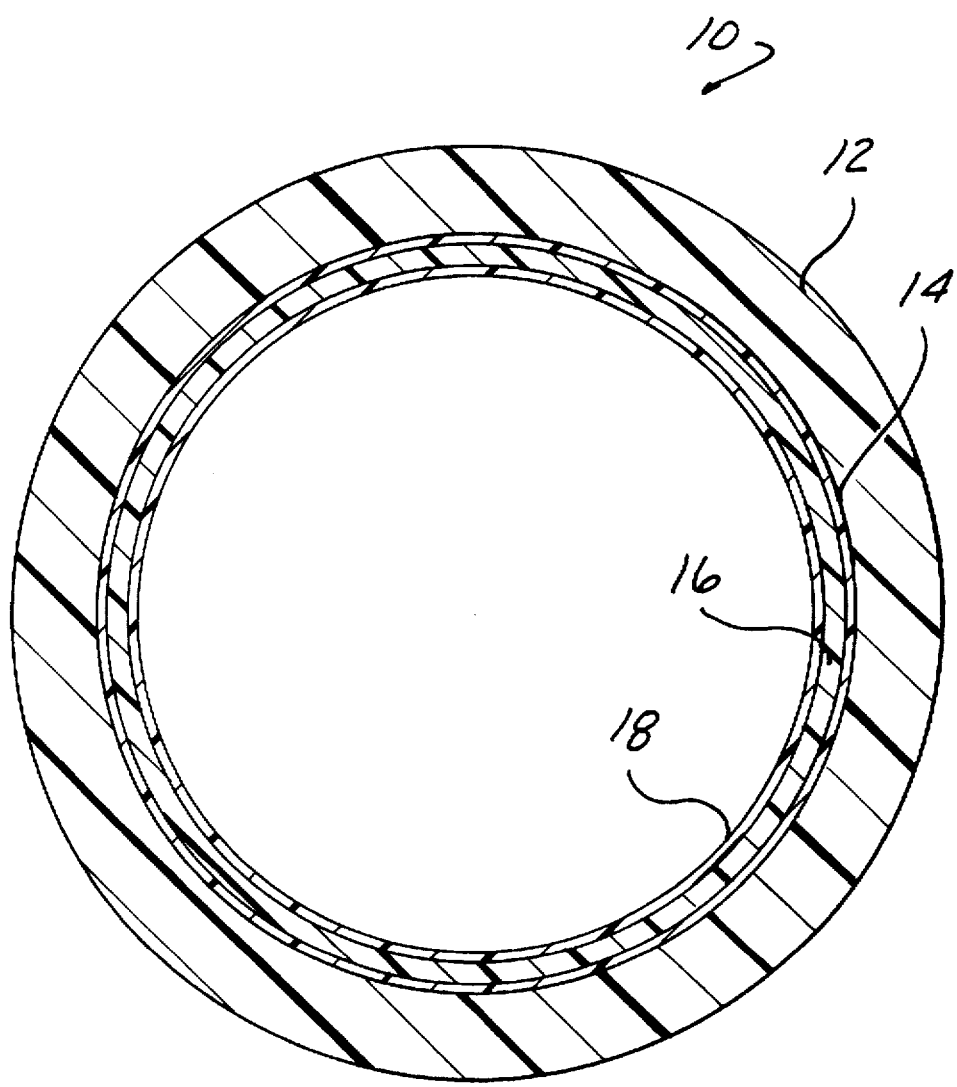
FIG. 1 is a sectional view through a piece of tubing of the present invention.

The present invention is a multi-layer fuel line and vapor tube which contains at least one bonding layer, at least an outer and an inner hydrocarbon barrier layer, and at least one conductive layer. The tubing of the present invention is, preferably, fabricated by co-extruding given thermoplastic materials in a conventional co-extrusion process. The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameters up to 2.5 inches are preferred.

The material may have any suitable wall thickness desired. However, in automotive systems such as those described herein, wall thicknesses between 0.5 mm and 2 mm are generally employed with wall thicknesses of approximately 0.8 to 1.5 mm being preferred. While it is within the scope of this invention to prepare a tubing having a plurality of overlaying layers of various thermoplastic materials, the tubing of the present invention generally has a maximum of four or five layers inclusive of the bonding layers. In the preferred embodiment, the tubing material has five layers.

The tubing 10 of the present invention is a material which is suitable for use in motor vehicles and comprises a relatively thick outer layer which is non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tube layer 12 as well as any interior layers bonded thereto would be suitable for use at an outer service temperature range between about −40° C. and about 150° C., with a range of −20° C. to 120° C. being preferred thus providing a multi-layer fuel and vapor tube with such a service temperature range. The various layers of tube of the present invention are integrally laminated to one another and resistant to delamination throughout the lifetime of the tubing. The tube of the present invention will have a tensile strength of no less than 25 N/mm$^2$ and an elongation value of at least 150% at standard temperature (23° C.). The tubing will have a burst strength at 23° C. and 120° C. of at least 20 bar. The multi-layer tube of the present invention is sufficiently resistant to exposure to brake fluid, engine oil and peroxides such as those which may be found in gasoline.

The outer layer 12 of the multi-layer tube of the present invention may be composed of any melt-processible extrudable thermoplastic material which is resistant to ultra violet degradation, extreme changes in heat, exposure to environmental hazards such as zinc chloride, and degradation upon contact with engine oil and brake fluid. In general, the outer layer is composed of a thermoplastic material selected from the group consisting of 12 carbon block polyamides, 11 carbon block polyamides and zinc chloride resistant 6 carbon block polyamides. In an alternate embodiment, the outer layer 12 is composed of a thermoplastic material composed of an extrudable melt processible thermoplastic elastomer. The thermoplastic materials which compose the outer layer 12 can be employed in their unmodified state or can be modified with various plasticizers, flame retardants and the like in manners which would be known to one reasonably skilled in the art.

In the first embodiment, polyamides such as Nylon 12, Nylon 11, and zinc chloride resistant Nylon 6 can be effectively employed with Nylon 12 being preferred. It is anticipated that the Nylon 12 may be either modified or unmodified. If modified, it is anticipated that the material will contain various plasticizers as are readily known in the art. Where required, the Nylon 12 can be modified by suitable additives to provide a Nylon 12 material which will resist impacts of two foot pounds at −20° C. as measured by test method SAE J 844 paragraph 9.11 as revised June 1990. Such materials are readily available as articles of commerce. Alternately, the polyamide employed may be one which possesses such cold impact resistance inherently.

The polyamide employed, preferably, has an elongation value of 150% at 23° C. as measured by the method outlined in ASTM D 638-89 paragraph 7.9.

In the second embodiment, the outer layer 12 is composed of a thermoplastic elastomer material. As used herein, the term "thermoplastic elastomer" are those materials which are extrudable elastomeric alloys which may be classified as either thermoplastic vulcanates or melt processible rubbers. In general, the thermoplastic vulcanates which can be employed herein are essentially a fine dispersion of highly vulcanized rubber in a continuous phase of a polyolefin. Thermoplastic vulcanates have a tensile strength between about 7.6 and about 26.9 MPa, an elongation at 23° C. of 300 to 600% and exhibit resistance to compression and tension set, oil resistance, resistance to flex fatigue and a maximum service temperature of 135° C. (275° F.). The specific gravity of thermoplastic vulcanates is 0.9 to 1.0; and of melt processible rubbers is 1.2 to 1.35.

Preferably, in the second embodiment, the outer layer 12 is a thermoplastic elastomer selected from the group consisting of alloys of rubber and polyolefins, and alloys of rubber and polyvinyl chloride. Suitable alloys of rubber and polyolefins are commercially available under the tradename SANTOPRENE. Suitable alloys of rubber and polyvinyl chloride are commercially available under the tradenames SARLINK and VICHEM ETHAVIN.

In the second embodiment, SANTOPRENE 251-80, SANTOPRENE 251-92 and SANTOPRENE 253-36 can be successfully employed with SANTOPRENE 251-80 being preferred. These materials are proprietary compositions commercially available from Advanced Elastomer Systems of St. Louis, MI. The materials are characterized as thermoplastic rubber in which cross-linked rubber particles are dispersed throughout a continuous matrix of thermoplastic material with the rubber particles having an average size of 1 μm and a hardness grade between about 55 Shore A and about 50 Shore D. Typical characteristics of these materials are listed in Table I.

Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500°. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

SARLINK is a proprietary thermoplastic elastomer alloy of rubber and polyvinyl chloride commercially available from Novacor Chemicals Inc. of Leominster, Mass. The specific gravity ranges from 1.13 to 1.22. The modulus at 100% ranges between 260 and 570 psi. The tensile strength ranges between 780 about 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

In this second embodiment, VICHEM ETHAVIN C-75FR, VICHEM ETHAVIN C-68FR and VICHEM ETHAVIN C-75FR can also be successfully employed; with VICHEM ETHAVIN C-75FR being preferred. VICHEM ETHAVIN are proprietary compounds commercially available from the Vichem Corporation of Grand Rapids, Mich. These materials are proprietary alloys of rubber and polyvinyl chloride. The characteristics of these materials are listed in Table I.

The outer layer 12 preferably has a wall thickness between about 0.5 mm and about 0.8 mm with a preferred range being between about 0.6 and about 0.75 mm. As indicated previously, the material is extruded by conventional co-extrusion methods to any continuous length desired.

The tubing 10 of the present invention includes an intermediate bonding layer 14 adhering and attached to the inner surface of the thick outer layer 12. The intermediate bonding layer 14 is preferably co-extruded with the other layer 12 and is composed of a material which is capable of achieving a suitable homogeneous bond between itself, the thick outer layer 12 and any inner layers interposed thereon. The intermediate bonding layer 14 is generally composed of a more elastic material than that employed in inner layers, the compositions of which will be described subsequently.

The intermediate bonding layer 14 is composed of a thermoplastic material which may exhibit properties of resistance to the permeation of aliphatic and aromatic materials such as those found in fuel in addition to exhibiting suitable bonding characteristics. In the first embodiment, the thermoplastic material employed herein is preferably a melt-processible co-extrudable fluoroplastic blend which will exhibit an affinity to conventional polymers such as Nylon 12, and may optionally contain various plasticizers and other modifying agents. The fluoroplastic which comprises the intermediate bonding layer 14 consists essentially of: a polyvinyl fluoride compound selected from the group consisting of polyvinylidine fluoride polymers, polyvinyl fluoride polymers, and mixtures thereof; a vinylidene fluoride—chlorotrifluoroethylene copolymer; and a polyamide material selected from the group consisting of 12 carbon block polyamides, 11 carbon block polyamides, 6 carbon block polyamides, and mixtures thereof. The vinylidine fluoride—chlorotrifluoroethylene copolymer preferably, contains between about 60% and about 80% by weight polyvinylidine difluoride. In the preferred embodiment, the intermediate bonding layer 14 consists essentially of between about 35% and about 45% by weight of a copolymer of vinylidinefluoride and chlorotrifluoroethylene; between 25% and about 35% by weight polyvinylidine fluoride; and between about 25% and about 35% by weight of a polyamide selected from the group consisting of 12 carbon block polyamides 11 carbon block polyamides, and mixtures thereof. One such polymeric material suitable for use in the multi-layer tubing of the present invention is commercially available from Central Glass of Ube City, Japan under the trade designation CEFRAL SOFT XUA-2U. This proprietary material is a graft copolymer of a fluorine-containing elastomeric polymer with a fluorine-containing crystalline polymer. The elastomeric polymer is, preferably, a material copolymerized from an alkyl difluoride selected from the group consisting of vinyl difluoride, vinylidine difluoride, and mixtures thereof, and a chlorofluoroalkene selected from the group consisting of ethylene chlorotrifluoroethylene. The crystalline polymer is preferably a haloalkene such as ethylene chlorotrifluoroethylene.

In the first embodiment, the bonding layer 14 is, preferably, the product of the copolymerization of ethylene chlorotrifluoroethylene and a vinylidine difluoride chlorotrifluoroethylene copolymer having a melting point between about 180° C. and about 210° C. and a molding temperature between about 230° C. and about 260° C.

In the second embodiment, the bonding layer 14 is a blend of a thermoplastic elastomer selected from the group consisting of alloys of rubber and polyolefin, and alloys of rubber and polyvinyl chloride combined with a fluoropolymer. The fluoropolymer is selected from the group consisting of polyvinylidene fluoride, polyvinyl fluoride, graft copolymers of polyvinylidene fluoride and chlorotrifluoroethane, graft copolymers of polyvinyl fluoride and chlorotrifluoroethane, and mixtures thereof. The blend preferably contains between about 30 and about 70% thermoplastic elastomer with the balance being fluorine-containing compound. Suitable material is prepared by blending the thermoplastic elastomer with the fluoropolymer and pelletizing the resulting material. The resulting material can be extruded using a twin screw extruder.

Preferably, the thermoplastic elastomer employed in the bonding layer 14 is chemically similar to that employed in the outer layer 12. Thus, where an alloy of rubber and polyolefin such as SANTOPRENE 251-80 is employed in the outer layer 12, the thermoplastic elastomer employed in the blend used in the intermediate layer is, preferably, SANTOPRENE 251-80. This is similarly true for VICHEM ETHAVIN and SARLINK.

The interior layer 16 is integrally bonded onto the inner surface of the thick outer polyamide layer by means of the intermediate bonding layer 14. In the present invention, the interior layer 16 is a chemically dissimilar permeation resistant, chemical resistant, fuel resistant thermoplastic material which is melt-processible in normal ranges of extrusion, i.e. about 175° to about 250° C. By the term "chemically dissimilar" it is meant that the interior layer 16 is a non-polyamide material which is capable of adhesion to the intermediate bonding layer 14 interposed between the thick outer layer 12 and the interior layer 16.

In the preferred embodiment, the thermoplastic material which comprises the interior layer 16 is selected from the group consisting of polyvinylidine fluoride, polyvinyl fluoride, and mixtures thereof. The material can also be a graft copolymer of the preceding materials together with a fluorine-containing polymer such as copolymers of vinylidine fluoride and chlorotrifluoroethane. Suitable material employed would contain between about 60% and about 80% by weight polyvinylidine difluoride. Materials so formed have a melting point between about 200° and about 220° C. and a molding temperature between about 210° and about 230° C.

The multi-layer tubing of the present invention also includes an innermost electrostatic dissipation layer 18 which is also capable of serving as a hydrocarbon barrier to assist in the prevention of permeation of aromatic and aliphatic compounds found in gasoline through to the outer layer 12 of the tubing and, thus, out to the surrounding environment.

In the preferred embodiment, the innermost layer 18 is integrally bonded to the inner surface of the interior layer 16. In the present invention, the innermost layer 18 is composed of a thermoplastic material chemically dissimilar to the thermoplastic material employed in the outer layer 12 which is melt-processible in the normal ranges of extrusion, i.e. about 175° C. to about 250° C. The thermoplastic material employed in the innermost layer 18 is capable of sufficiently permanent laminar adhesion to the interior layer 16.

In the preferred embodiment, the thermoplastic material which comprises the innermost layer 18 consists essentially of: a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a non-fluorinated elastomer. The thermoplastic material employed in the present invention, preferably contains between about 10% and about 18% by weight of a vinylidine fluoride-chlorotrifluoroethylene copolymer which itself has a vinylidine fluoride content between about 40% and 60% by copolymer weight. The material also, preferably contains between about 50% and about 70% by weight of a vinylidine fluoride-tetrafluoroethylene copolymer. The non-fluorinated elastomer is selected from the group consisting of polyurethanes, and mixtures thereof. In the preferred embodiment, the material contains between about 10% and about 25% by weight polyurethane.

The material also contains conductive media in quantities sufficient to permit electrostatic dissipation in a desired range. In the preferred embodiment, the innermost layer 18 exhibits electrostatic dissipation characteristics in that it is capable of dissipation of electrostatic charge in the range of $10^4$ to $10^9$ ohm/cm$^2$. The conductive material employed may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing. In the preferred embodiment, the fluoroplastic material contains conductive material in an amount sufficient to effect electrostatic dissipation. However, the maximum amount employed therein is less than 5% by volume with a concentration between about 2% and about 4% being preferred.

The conductive material can either be interstitially integrated into the crystalline structure of the polymer or can be co-polymerized therewith. Without being bound to any theory, it is believed that carbon-containing materials such as carbon black may be subject to carbon co-polymerization with the surrounding fluoroplastic material. Material such as stainless steel are more likely to be interstitially integrated into the crystalline structure of the polymer. Suitable material is commercially available under the tradename XPV-504KRC CEFRAL SOFT CONDUCTIVE.

In the preferred embodiment, the innermost layer 18 is maintained at thicknesses suitable for achieving static dissipation and suitable laminar adhesion respectively; generally between about 10% and 20% of the thick outer layer. The thickness of the innermost layer 18 is preferably between about 0.1 mm and about 0.2 mm. The intermediate bonding layer preferably has a thickness approximately equal to the thickness of the innermost layer preferably between about 0.05 mm and about 0.15 mm.

The interior layer 16 is maintained at a thickness suitable to achieve a hydrocarbon permeation value for the tubing of the present invention no greater than about 0.5 g/m$^2$ in a 24 hour interval. To accomplish this, the characteristics of the interior layer 16 can be relied upon solely or in concert with the intermediate bonding layer. It is anticipated that the thickness of the inner and intermediate layers can be modified to accomplish this end. In the preferred embodiment, the interior layer 16 has a thickness between about 10% and about 20% of the thick outer layer. In the preferred embodiment, the interior layer has a thickness between about 0.15 mm and about 0.25 mm with a thickness of about 0.18 mm to about 0.22 mm being preferred. The intermediate bonding layer 14 is maintained at a thickness sufficient to permit sufficient laminar adhesion between the outer and interior layers. The intermediate bonding layer generally has a thickness less than that of the inner layer 16. The thickness of this layer is, preferably, between about 0.05 and about 0.1 mm.

The total wall thickness of the tubing of the present invention is generally between about 0.5 mm and about 2.0 mm with a wall thickness between about 0.8 and about 1.25 mm being preferred.

Figure 2:
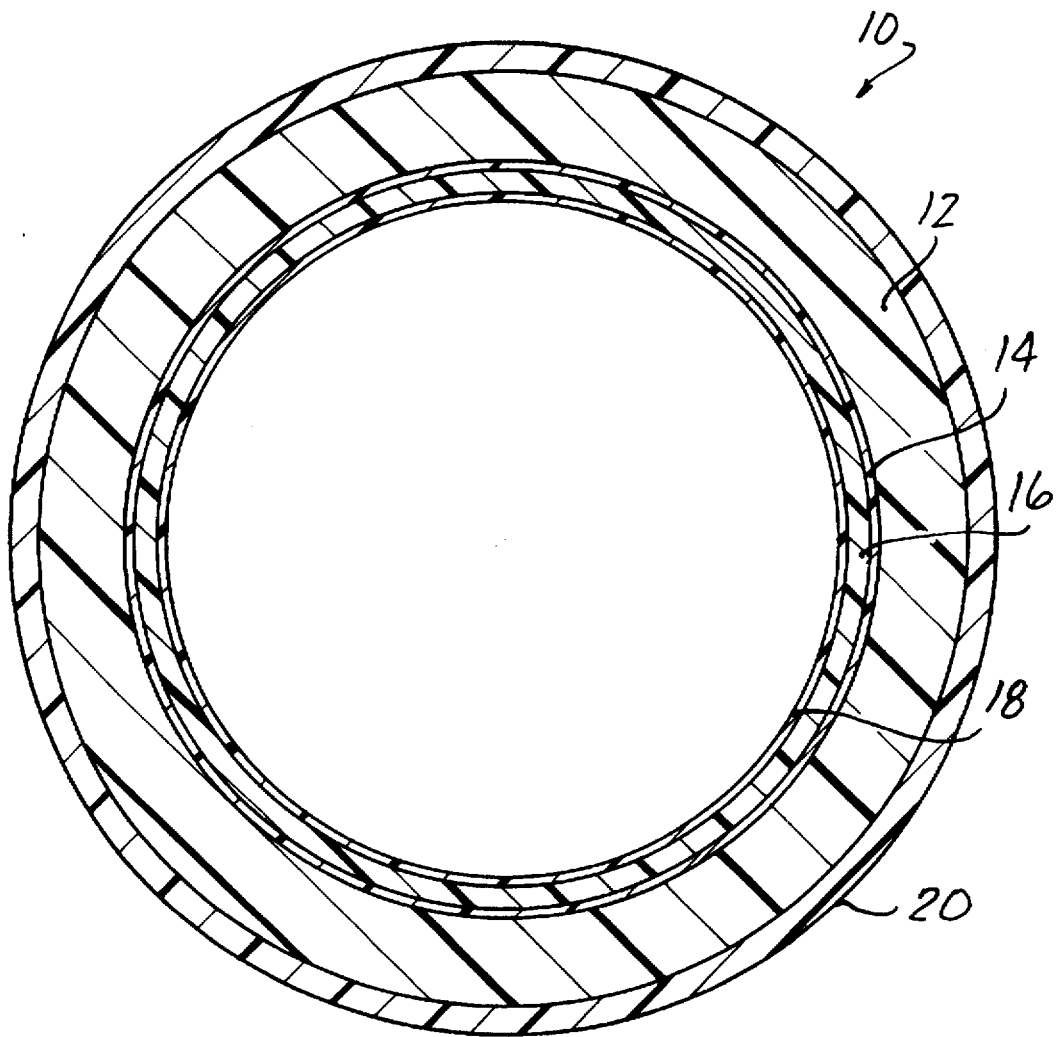
FIG. 2 is a sectional view through a piece of tubing of the present invention having an optional exterior jacket.

The tubing of the present invention may also, optionally include an outer jacket 20 (shown in FIG. 2) which surrounds the outer layer. The fourth outer jacket may be either co-extruded with the other layers during the extrusion process or may be put on in a subsequent process such as cross-extrusion. The outer jacket may be made of any material chosen for its structural or insulating characteristics and may be of any suitable wall thickness. In the preferred embodiment, the outer jacket maybe made of a thermoplastic material selected from the group consisting of zinc-chloride resistant Nylon 6, Nylon 11, Nylon 12, polypropylene, and thermoplastic elastomers such as SANTOPRENE, VICHEM and SARLINK described previously. If desired, these materials may be modified to include flame retardants, plasticizers and the like.

While preferred embodiments, forms and arrangements of parts of the invention have been described in detail, it will be apparent to those skilled in the art that the disclosed embodiment may be modified. Therefore, the foregoing description is to be construed as exemplary rather than limiting. The terms and scope of the invention is that defined in the claims.

TABLE I

| CHARACTERISTICS OF THERMOPLASTIC ELASTOMERS* | | | |
|---|---|---|---|
| | Vichem Ethavin C-68-FR | Vichem Ethavin C-75-FR | Vichem Ethavin C-85-FR |
| Requirements Original Property - unaged | | | |
| Wall thickness | 0.079 | 0.101 | 0.079 |
| hardness (15 sec. delay) | 68 | 75 | 68 |
| tensile psi | 1380 | 1213 | 1380 |
| elongation % | 243 | 247 | 243 |
| specific gravity | 1.32 | 1.32 | 1.32 |
| Properties after 24 hr. @ 300° F. | | | |
| hardness | 74 | 79 | 74 |
| tensile psi | 1140 | 1125 | 1140 |
| elongation | 250 | 260 | 250 |
| 70 hrs @ 308° F. | | | |
| hardness | 75 | 80 | 75 |
| tensile | 1100 | 1109 | 1100 |
| elongation | 193 | 183 | 193 |
| 168 hrs @ 300° F. | | | |
| hardness | 77 | 80 | 77 |
| tensile psi | 1010 | 999 | 1010 |
| elongation | 167 | 198 | 167 |

TABLE I-continued

| CHARACTERISTICS OF THERMOPLASTIC ELASTOMERS SANTOPRENE 251-80 | | | |
|---|---|---|---|
| Property | Test Method | Units | Value |
| hardness (5 sec) | ASTM D 2240 | Shore A | 80 |
| Specific Gravity | ASTM D 792 | | 1.24 |
| Tensile Strength (ultimate) | ASTM D 412 | psi | 1050 |
| Elongation (ultimate) | ASTM D 412 | percent | 410 |
| 100% modulus | ASTM D 412 | psi | 460 |
| Compression set (168 hrs) | ASTM D 398 Method B | % at 77° F. % at 212° F. | 27.1 45.3 |
| Tension Set | ASTM D 412 | % | 10 |
| Tear Strength | ASTM D 624 | pri at 25° C. pli at 212° C. | 135 53 |
| Brittle point | ASTM D 746 | °F. | <−69 |
| Dielectric Constant | 2.44 | | |
| Dielectric Strength | 3.17 mm (125 mil) | 19.6 kv/mm (500 v/mil) | |
| Aging Properties Retained properties after air aging 168 hrs @ 150° C. (302° F.) | | | |
| retained tensile strength | | 101% | |
| retained elongation | | 90% | |
| Properties after 168 hrs @ 100° C. in ASTM No. 3 Oil | | | |
| retained tensile strength | | 74% | |
| retained elongation | | 63% | |
| weight change | | 40% | |

*Source General Motors specification 6092M Gas line protector

TABLE II

| COMPARISON OF ETHAVIN C-85-FR TO NORMAL VINYL | | |
|---|---|---|
| Original | C-85-FR | Normal Vinyl |
| Hardness (Duro C) | 62C | 62C |
| Specific Gravity | 1.32 | 1.36 |
| Tensile Strength psi | 1532 | 2568 |
| Elongation % | 340 | 355 |
| Air Oven (70 Hrs. @ 100° C.) | | |
| Hardness (Duro C) | 62C | 62C |
| % Change | 0 | 0 |
| Weight Change | −2.75 | −3.30 |
| Tensile Strength psi | 1606 | 2232 |
| % Change | +5.5 | −13.1 |
| Elongation % | 335 | 265 |
| % Change | −1.5 | −25.4 |
| Immersion ASTM Fuel B (70 Hrs. @ 23° C.) | | |
| Hardness (Duro C) | 75C | 95C |
| % Change | +21.0 | +53.2 |
| Weight Loss | −10.35 | −16.8 |
| Tensile Strength psi | 1770 | 2454 |
| % Change | +16.2 | −4.4 |
| Elongation % | 225 | 185 |
| % Change | −33.8 | −47.9 |

TABLE III

ETHAVIN C-85FR COMPARED TO
SAE J200 M2BG 910, A14, C12, EA14, EF11, $Z_1$, $Z_2$, $Z_3$, $Z_4$

| | Specification | Ethavin C-85FR |
|---|---|---|
| Hardness | 90 ± 5 | 86 |
| Tensile Strength | | |
| psi min | 1450 | 1655 |
| MPa min | 10 | 11.4 |
| Ultimate Elongation % min | 100 | 220 |
| Heat Aged (ASTM 0573) 70 hrs @ 100° C. | | |
| Change in Tensile Strength | ±30% | +5.5% |
| Change in Elongation | −50% max | −1.5% |
| Change in Hardness | ±15 points | 0 |
| Resistance to Ozone ASTM D1171 | to be determined | 95% |
| Quality Retention Rating | | |
| Water Resistance (ASTM D471) 70 hrs @ 100° C. | | |
| Change in Hardness | ±10 points | 0 |
| Change in Volume | ±15% | 0 |
| Fluid Resistance (ASTM D471) 7 hrs @ 23° C. Reference Fuel A | | |
| Change in Hardness | ±10 points | +3 |
| Change in Tensile Strength | −25% max | +1.9% |
| Change in Elongation | −25% max | −23.5% |
| Change in Volume | −5 to +10% | (−4%) |
| $Z_1$ = Flammability (FMVSS #302) | 4 ipm max | DNI* |
| $Z_2$ = Low Temperature Flexibility @ −40° C. around Mandrel 10× O.D. of sample | no cracks | no cracks |
| $Z_3$ =Heat Aged (ASTM D573) 70 hrs @ 150° C. | | |
| Change in Tensile, % | +7 max | +4.6 |
| Change in Elongation, % | −25 max | −21.7 |
| Change in Hardness, pts | +15 max | +10 |
| $Z_4$ =Oil Resistance (ASTM D471) 70 hrs @ 125° C. in ASTM #3 Oil | | |
| Volume Change, % | +15 max | +14 |

What is claimed is:

1. A layered tubing for use in a motor vehicle, the tubing comprising:

a flexible outer layer having a given thickness and an inner and an outer face, the outer layer consisting essentially of an extrudable thermoplastic composed of polyamides and thermoplastic elastomers selected from the group consisting of thermoplastic vulcanates and melt processible rubbers;

an intermediate bonding layer bonded to the inner face of the outer layer, the intermediate bonding layer consisting essentially of an extrudable melt processible thermoplastic capable of sufficiently permanent laminar adhesion to the inner face of the outer layer;

an interior layer bonded to the intermediate bonding layer, the interior layer consisting essentially of an extrudable, melt-processible thermoplastic material capable of sufficiently permanent laminar adhesion with the intermediate bonding layer, the melt-processible thermoplastic of the interior layer being chemically dissimilar to the thermoplastic employed in the outer layer and containing at least one fluoroplastic component, the melt-processible thermoplastic of the interior layer being resistant to permeation by and interaction with short-chain aliphatic and aromatic hydrocarbon compounds; and an innermost electrostatic dissipation layer integrally bonded to the interior layer, the electrostatic dissipation layer consisting of an extrudable, melt-processible thermoplastic material capable of sufficiently permanent laminar adhesion with the intermediate bonding layer and of dissipating electrostatic energy, the electrostatic dissipation capacity being in a range between about $10^4$ to $10^9$ ohm/cm².

2. The layered tubing of claim 1 wherein the flexible outer layer consists essentially of a material selected from the group consisting of polyamides and thermoplastic elastomers selected from the group consisting of alloys of rubber and polyvinyl chloride, alloys of rubber and polyolefins and mixtures thereof.

3. The layered tubing of claim 2 wherein the thermoplastic elastomer has an ability to withstand impacts of at least 2 foot pounds at temperatures below about −20° C.

4. The layered tubing of claim 3 wherein the thermoplastic elastomer has an elongation value of 150% at 23° C.

5. The layered tubing of claim 2 wherein the interior layer is a composed of thermoplastic material consisting essentially of a fluoroplastic material selected from the group consisting of polyvinylidine fluoride, polyvinyl fluoride, and mixtures thereof.

6. The layered tubing of claim 5 wherein the fluoroplastic material further consists of copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof.

7. The layered tubing of claim 5 wherein the interior layer has a thickness between about 10% and about 20% of the thick outer layer.

8. The layered tubing of claim 2 wherein the innermost electrostatic dissipation layer consists of a thermoplastic material which is chemically dissimilar to the thick outer layer.

9. The layered tubing of claim 8 wherein the innermost electrostatic dissipation layer is composed of a thermoplastic material consisting essentially of:

a copolymer of a vinyl fluoride and chlorotrotrifluoroethylene, the vinyl fluoride material selected from the group consisting of polyvinylidine fluoride, polyvinyl fluoride, and mixtures thereof;

a copolymer of a vinyl fluoride material and ethylene tetrafluoroethylene; and a non-fluorinated elastomer comprising polyurethane.

10. The layered tubing of claim 9 wherein the electrostatic dissipation layer consists essentially of:

between about 10% and about 18% by weight of a vinylidine fluoride-chlorotrifluoroethylene copolymer, the copolymer having between about 40% and 60% by weight vinylidine fluoride;

between about 50% and about 70% by weight of a vinylidine fluoride-tetrafluoroethylene copolymer, the copolymer having between about 40% and about 60% by weight vinylidine fluoride; and between about 10% and about 25% by weight polyurethane.

11. The layered tubing of claim 9 wherein the conductive material is selected from a group consisting of elemental carbon, copper, silver, gold, nickel, silicon, and mixtures thereof.

12. The layered tubing of claim 9 wherein the conductive material is present in an amount less than about 5% by volume of the electrostatic dissipation layer thermoplastic material.

13. The layered tubing of claim 9 wherein the conductive material is interstitially integrated into the electrostatic dissipation layer thermoplastic material.

14. The layered tubing of claim 8 wherein the innermost electrostatic dissipation layer has a thickness between about 10% and about 20% of the outer layer.

15. The layered tubing of claim 14 wherein the innermost electrostatic dissipation layer further contains quantities of a conductive material sufficient to provide electrostatic dissipation capability in a range between about $10^4$ and about $10^9$ ohm/cm$^2$.

16. The layered tubing of claim 2 wherein the intermediate bonding layer is a thermoplastic material consisting essentially of:

a thermoplastic elastomeric compound selected from the group consisting of alloys of rubber and polyvinyl chloride, alloys of rubber and polyolefins, and mixtures thereof; and a fluoropolymer compound selected from the group consisting of polyvinylidine fluoride, polyvinyl fluoride, copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof.

17. The layered tubing of claim 16 wherein the thermoplastic elastomeric compound is a thermoplastic vulcanate present in an amount between about 30% and 70% by volume of the thermoplastic material.

18. The tubing of claim 1 further comprising an exterior jacket overlying the outer tubing, the exterior jacket composed of a material consisting essentially of a thermoplastic material selected from the group consisting of Nylon 11, Nylon 12, zinc chloride resistant Nylon 6, polypropylene, thermoplastic elastomers and mixtures thereof.

19. A layered tubing for use in a motor vehicle, the tubing comprising:

a flexible outer layer having a given thickness and an inner and an outer face, the outer layer consisting essentially of an extrudable thermoplastic elastomer selected from the group consisting of alloys of rubber and polyolefin, alloys of rubber and polyvinyl chloride, and mixtures thereof;

an intermediate bonding layer bonded to the inner face of the thick outer layer, the intermediate bonding layer consisting essentially of an extrudable thermoplastic capable of sufficiently permanent laminar adhesion to the outer layer;

an interior layer bonded to the intermediate bonding layer, the interior layer consisting essentially of an extrudable, melt-processible thermoplastic material capable of sufficiently permanent laminar adhesion with the intermediate bonding layer, the melt-processible thermoplastic resistant to permeation by and interaction with short-chain aliphatic and aromatic hydrocarbon compounds, the melt-processible thermoplastic selected from the group consisting of polyvinylidine fluoride, polyvinyl fluoride, copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof; and an innermost electrostatic dissipation layer integrally bonded to the interior layer, the electrostatic discharge layer consisting essentially of an extrudable, melt-processible thermoplastic material capable of sufficiently permanent laminar adhesion with the intermediate bonding layer and of dissipating electrostatic energy, the electrostatic dissipation capacity being in a range between about $10^4$ and about $10^9$ ohm/cm$^2$, the melt-processible thermoplastic consisting essentially of:

between about 10% and about 18% by weight of a vinylidine fluoride-chlorotrifluoroethylene copolymer, the copolymer having between about 40% and 60% by weight vinylidine fluoride;

between about 50% and about 70% by weight of a vinylidine fluoride-tetrafluoroethylene copolymer, the copolymer having between about 40% and about 60% by weight vinylidine fluoride; and between about 10% and about 25% by weight polyurethane.

20. The layered tubing of claim 19 wherein the intermediate bonding layer consists essentially of:

a thermoplastic elastomer selected from the group consisting of alloys of rubber and polyvinyl chloride, alloys of rubber and polyolefins, and mixtures thereof; and a fluoroplastic selected from the group consisting of polyvinylidine fluoride, polyvinyl fluoride, copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof.

21. The layered tubing of claim 19 wherein the intermediate bonding layer has a thickness between about 0.05 mm and about 0.1 mm, the interior layer has a thickness between about 0.05 mm and about 0.15 mm and the innermost electrostatic dissipation layer has a thickness between about 0.1 mm and about 0.2 mm.

22. A layered tubing for use in a motor vehicle, the tubing comprising:

a flexible outer layer having a given thickness and an inner and outer face, the outer layer consisting of an extrudable melt-processible thermoplastic;

an intermediate bonding layer bonded to the inner face of the outer layer, the intermediate bonding layer consisting essentially of an extrudable melt-processible thermoplastic capable of sufficiently permanent laminar adhesion to the inner face of the outer layer, the melt-processible thermoplastic selected from the group consisting of:

a) a thermoplastic elastomeric compound selected from the group consisting of alloys of rubber and polyvinyl chloride, alloys of rubber and polyolefins, and mixtures thereof; and b) a fluoropolymer compound selected from the group consisting of polyvinylidine fluoride, polyvinyl fluoride, copolymers of vinylidine difluoride and chlorotrifluoroethylene copolymerized with polyvinylidine fluoride, copolymers of vinylidine difluoride and chlorotrifluoroethylene copolymerized with polyvinyl fluoride, and mixtures thereof;

an interior layer bonded to the intermediate bonding layer, the interior layer consisting essentially of an extrudable thermoplastic capable of sufficiently permanent laminar adhesion with the intermediate bonding layer, the melt-processible thermoplastic of the interior layer being chemically dissimilar to the thermoplastic employed in the outer layer, the melt-processible thermoplastic of the interior layer being resistant to permeation by and interaction with short-chain aliphatic and aromatic hydrocarbon compounds; and an innermost electrostatic dissipation layer integrally bonded to the interior layer, the electrostatic dissipation layer consisting of an extrudable, melt-processible thermoplastic material capable of sufficiently permanent laminar adhesion with the intermediate bonding layer and of dissipating sufficient electrostatic energy to prevent build-up of electrostatic charge.

23. The layered tubing of claim 22 wherein the flexible outer layer consists essentially of an extrudable thermoplastic elastomer selected from the group consisting of alloys of rubber and polyvinyl chloride, alloys of rubber and polyolefins, and mixtures thereof.

24. The layered tubing of claim 22 wherein the interior layer is composed of a thermoplastic material consisting essentially of a fluoroplastic material selected from the group consisting of polyvinylidine fluoride, polyvinyl fluoride, and mixtures thereof.

25. The layered tubing of claim 24 wherein the fluoroplastic material further consists of copolymers vinylidine difluoride and chlorotrifluoroethylene copolymerized with polyvinylidine fluoride, copolymers of vinylidine fluoride and chlorotrifluoroethylene copolymerized with polyvinyl fluoride and mixtures thereof.

26. The layered tubing of claim 22 wherein the innermost electrostatic dissipation layer is composed of a thermoplastic material consisting essentially of:

between about 10% and about 18% by weight of a vinylidine fluoride-chlorotrifluoroethylene copolymer, the copolymer having between about 40% and 60% by weight vinylidine fluoride;

between about 50% and about 70% by weight of a vinylidine fluoride-tetrafluoroethylene copolymer, the copolymer having between about 40% and about 60% by weight vinylidine fluoride;

between about 10% and about 25% by weight polyurethane; and less than about 5% by volume of a conductive material selected from the group consisting of elemental carbon, copper, silver, gold, nickel, silicon, and mixtures thereof.

27. The layered tubing of claim 22 wherein the innermost electrostatic dissipation layer contains conductive material selected from the group consisting of elemental carbon, copper, silver, gold, nickel, silicon, and mixtures thereof, the conductive material present in an amount less than about 5% by volume.

28. The layered tubing of claim 22 wherein the thermoplastic elastomeric compound of the thermoplastic material in the intermediate bonding layer is present in an amount between about 30% and 70% by volume of the thermoplastic material.

* * * * *

UNITED STATES PATENT AND TRADEMARK OFFICE
CERTIFICATE OF CORRECTION

PATENT NO. : 5,743,304
DATED : April 28, 1998
INVENTOR(S) : Frank L. Mitchell, David L. Noone & Tao Nie It is certified that error appears in the above-indentified patent and that said Letters Patent is hereby corrected as shown below:

Col. 3, line 25, after "about" please insert $--10^4$ and about $10^9--$.

Signed and Sealed this

Twentieth Day of October, 1998

Attest:

BRUCE LEHMAN

Attesting Officer

Commissioner of Patents and Trademarks